Feb. 24, 1948. C. S. CODY 2,436,713
AIR CONDITIONING APPARATUS HAVING MOUNTING
FOR MOTION RELATIVE TO WINDOWS
Filed June 15, 1946 3 Sheets-Sheet 3
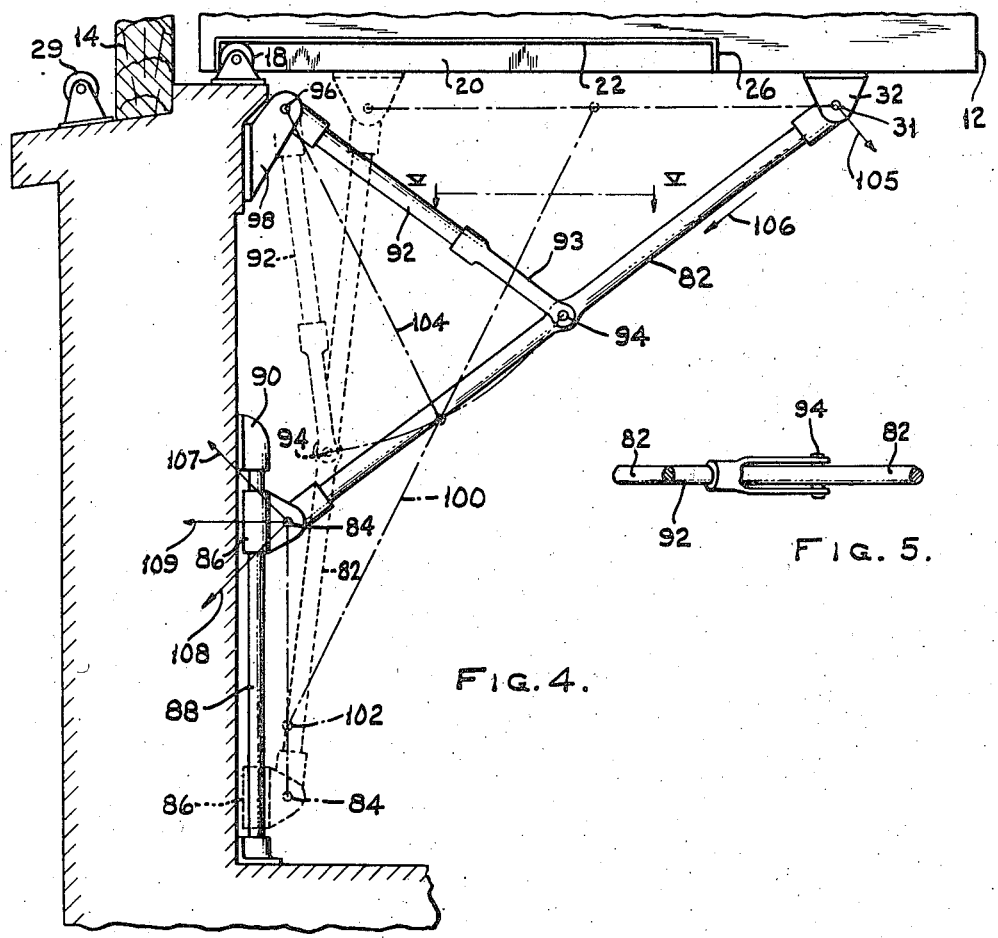
FIG. 4.
FIG. 5.
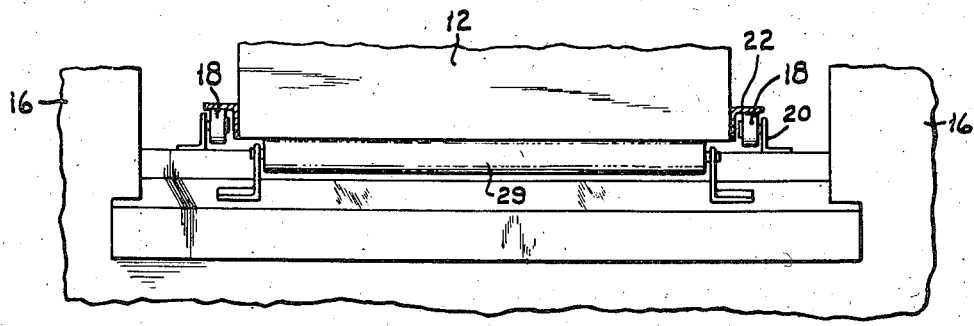
FIG. 3.
WITNESSES:
M. E. M. Closkey
E. H. Lutz
INVENTOR
CLIFFORD S. CODY
BY
ATTORNEY Patented Feb. 24, 1948

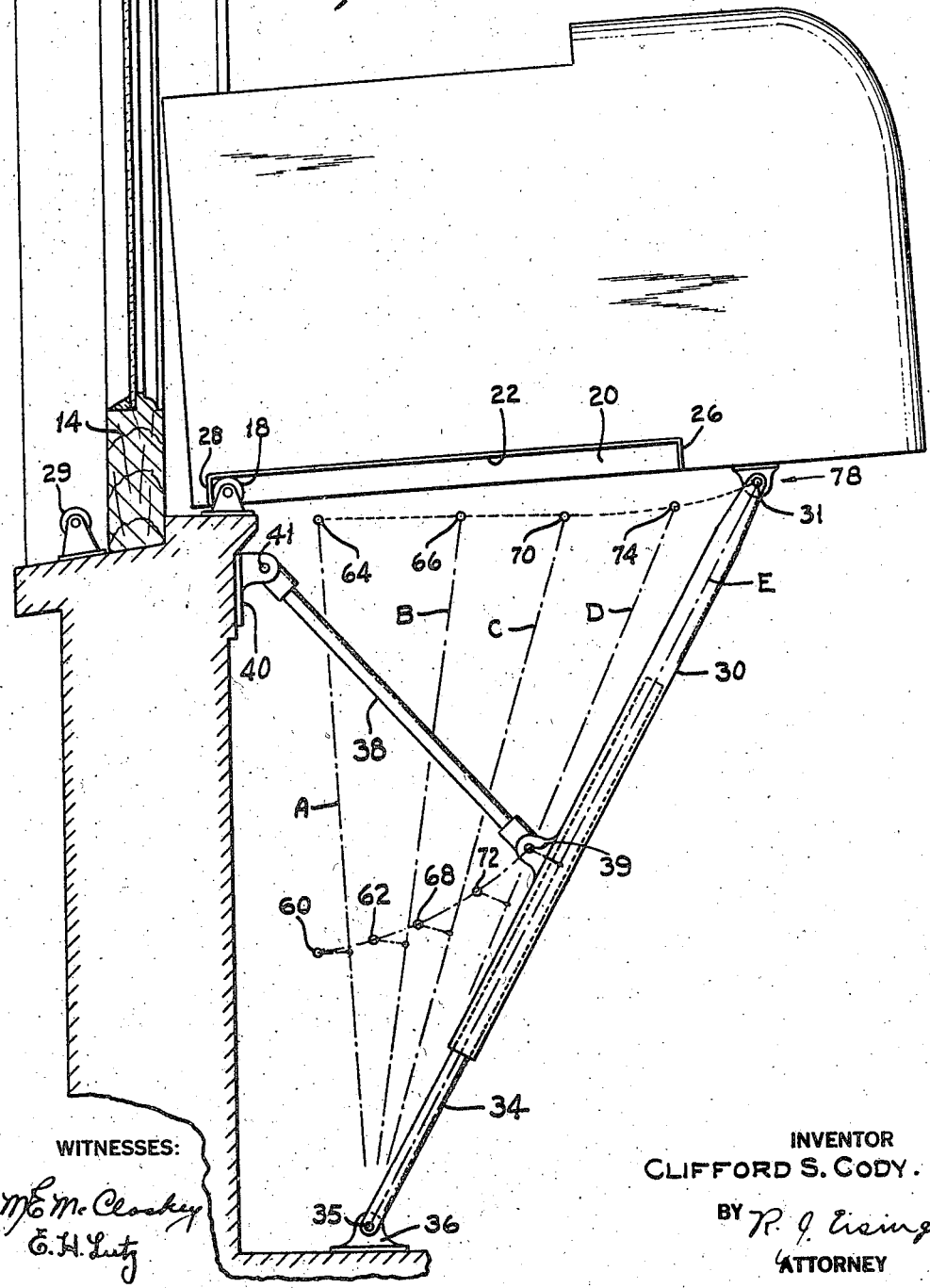

2,436,713

UNITED STATES PATENT OFFICE 2,436,713

AIR CONDITIONING APPARATUS HAVING MOUNTING FOR MOTION RELATIVE TO A WINDOW

Clifford S. Cody, Springfield, Pa., assignor to Westinghouse Electric Corporation, East Pittsburgh, Pa., a corporation of Pennsylvania Application June 15, 1946, Serial No. 676,935

9 Claims. (Cl. 98—94)

My invention relates to a window mounted air conditioning unit and, more particularly, to means for mounting an air conditioning unit in a window.

One object of the invention is to produce improved mounting means for a window mounted air conditioning unit.

A window mounted air conditioning unit is usually so disposed as to straddle the bottom sill of the window in which it is mounted, thereby preventing full movement of the window sashes. Also, an air conditioning unit of this type is secured to some part of the window structure, so that the unit cannot be removed without disconnecting the fastening means. Due to the bulk and weight of an air conditioning unit, it is extremely difficult to disconnect and remove the same when it is desired to temporarily close the window completely, or when full movement of the window sashes is desired to facilitate window washing or for other purposes.

It is, therefore, a further object of the invention to produce improved mounting means whereby an air conditioning unit may be bodily moved into position in a window, and whereby said unit may be bodily retracted from the window so as to permit free movement of the window sashes, without dismantling or disconnecting any part of the unit and without disconnecting any fastening means.

A still further object is to produce improved mounting means whereby the unit may be moved from one position to the other without any skill and with very little effort.

A still further object is to devise improved mounting means which is inexpensive to produce and which may be readily set up or dismantled with minimum damage to the floor or wall of the room or to the window structure.

A still further object is to produce improved mounting means which takes up minimum space and which, in all positions of the unit, is relatively inconspicuous so as not to detract from the appearance of the room.

These and other objects are effected by my invention as will be apparent from the following description and claims taken in connection with the accompanying drawings, forming a part of this application, in which:

Fig. 2 is a view similar to Fig. 1, showing the unit completely withdrawn from the window;

Fig. 3 is a fragmentary view, partly in section and partly in elevation, looking in the direction of line III—III of Fig. 1;

Fig. 4 is a view similar to Fig. 2, showing another embodiment of the invention; and Fig. 5 is a section on line V—V of Fig. 4.

Figure 1:
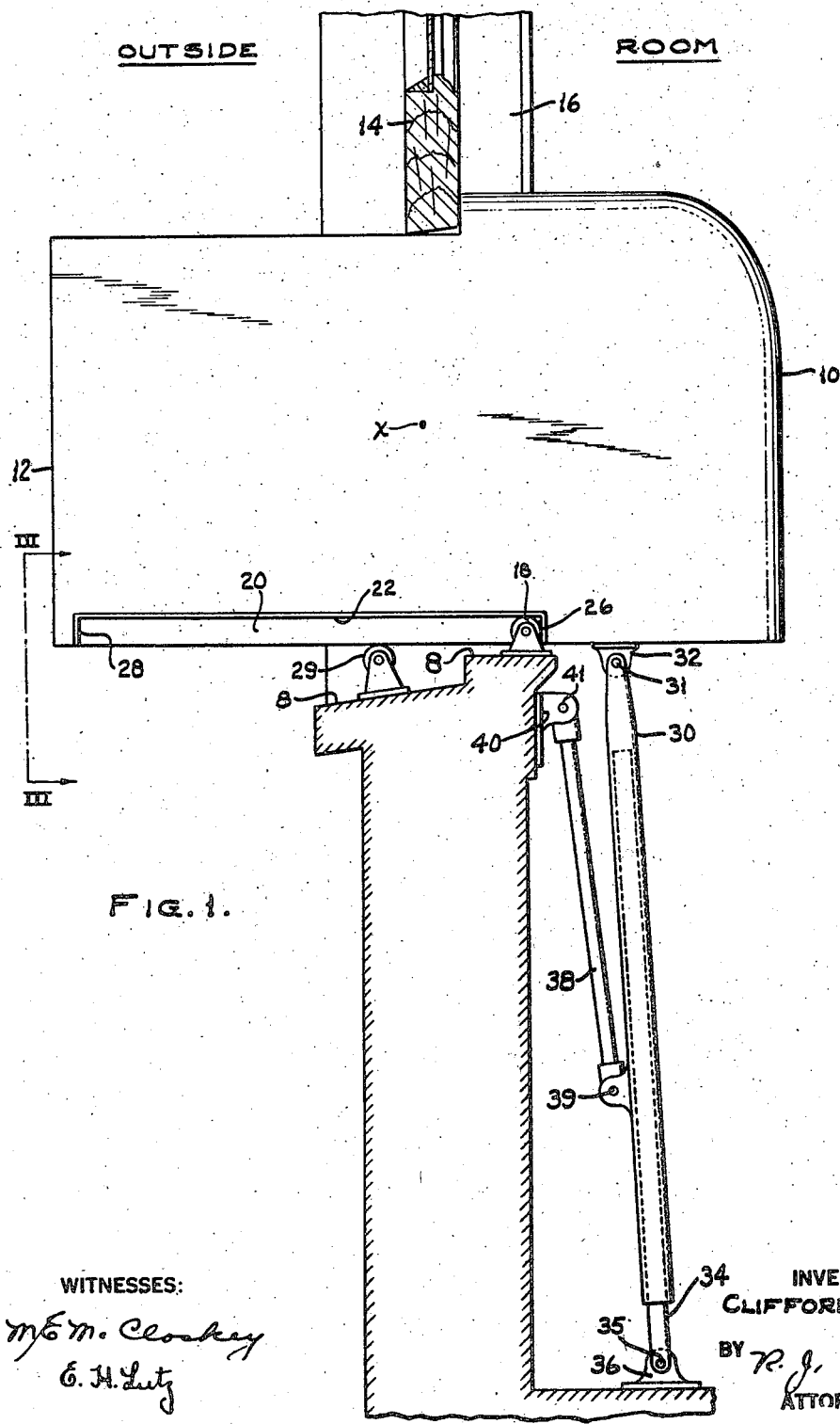
Fig. 1 is a diagrammatic view, partly in side elevation and partly in vertical section, of an air conditioning unit provided with mounting means embodying my invention, the unit being shown in its outermost position in the window.

In the drawings, there is shown an air conditioning unit which, when in use, straddles the bottom sill 8 of a window, with the inner or room end 10 of the unit extending into the room, and with the outer end 12 thereof extending through the window opening into the outside atmosphere. When the unit is in the position shown in Fig. 1, the lower end of a window sash, for example, the inner sash 14, rests on the top of the unit. Suitable sealing means, not shown, are provided for effecting a seal between the bottom of the sash and the top of the unit, and between the vertical sides of the unit and the side jambs 16 of the window. The sealing means referred to forms no part of the present invention and is, therefore, not shown nor described. It is, however, pointed out that the sealing means is so constructed and related to the unit that it is not in any way disturbed by movement of the unit into or out of position in the window.

The mounting means embodying my invention includes means for slidably supporting the unit at the window and means for resisting the turning moment of the unit about the slidable support, or supporting the room end of the unit, while permitting free movement of the unit toward and away from the window.

The means for slidably supporting the unit includes a pair of spaced rollers 18 carried by the inner portion of the window sill, and angle members having vertical side walls 20 secured to the opposite side walls of the unit, and horizontal walls 22 adapted to ride on the rollers 18. The room and outer ends of the horizontal walls 22 of the angle members are bent downwardly to form inner and outer stops 26 and 28, respectively, for limiting the movement of the unit relative to the window, as will be seen from Figs. 1 and 2.

Preferably, a roller 29 is provided and disposed on the bottom window sill on the outer side of the sash 14. As will be seen from Fig. 1, if the roller 29 is used, the center of gravity of the unit, shown at X, will be between the vertical planes of the rollers 18 and 29 and the unit will have no unsupported turning moment when the unit is positioned in the window.

In the embodiment shown in Figs. 1 and 2, the means for resisting the turning moment of the unit about the rollers 18 includes an upper sleeve 30, pivoted at 31 to a bracket 32 carried by the inner end of the unit, a rod 34 telescopically engaging the sleeve 30 and pivoted at 35 to a bracket 36, and a link 38 pivoted at one end thereof to the sleeve 30, as at 39, and pivoted at the other end thereof to a bracket 40, as at 41. The link 38 is preferably of a length substantially equal to the length of the portion of the upper sleeve 30 between the pivots 31 and 39. The bracket 36 is secured to a wall of a room, as for example, the lower portion of the vertical wall in which the window is formed, or, as shown, to the floor of the room, and the bracket 40 is secured to a support immediately below the lower window sill, as for example, to the vertical wall in which the window is formed. The brackets 32 and 36 are so located that, when the unit is in the position shown in Fig. 1, the rod 34 and the sleeve 30 are in substantially maximum overlapping relation, and the telescoping members 30 and 34 and the link 38 all assume a substantially vertical position.

Operation—Figs. 1 and 2

When the unit is to be used, it is moved out into the position shown in Fig. 1 and the sash 14 is lowered into sealing position relative to the top of the unit. When it is desired to close the window completely, as for example, when the unit is temporarily out of use, or when free movement of the window sashes is desired to facilitate window washing or for other purposes, the unit is retracted inwardly into the room until it reaches the position shown in Fig. 2. In this position, the outer end of the unit is spaced inwardly from the vertical plane of the inner sash 14 and the inner and outer sashes of the window may be freely moved up and down.

When the unit is in the position indicated by the broken line A in Fig. 2, which corresponds to the position shown in Fig. 1, the center of gravity of the unit will be in the vicinity of the point marked X in Fig. 1, or outwardly of a vertical plane passing through the center of the rollers 18 and, if the roller 29 is not used, the unit will have a turning moment, about the axes of the rollers 18, in the direction of the outside atmosphere. This turning moment exerts an upward force on the inner end of the unit and on the sleeve 30, thus causing the sleeve 30 to tend to move upwardly on the rod 34. This upward force is transmitted to and resisted by the link 38, the pivot points 39 and 41 of which are now in substantially vertical alignment. In this position, the link 38 is under compression.

When the unit is retracted into the room until its center of gravity is disposed inwardly of a plane passing through the center of the rollers 18, the unit will have a turning moment in the direction of the room, or clockwise in Figs. 1 and 2.

The manner in which this turning moment of the unit is resisted is graphically illustrated in Fig. 2, in which some of the positions which the unit and the telescoping members and the link 38 will assume, as the unit is moved from the position shown in Fig. 1 to the position shown in Fig. 2, and vice versa, are shown.

For example, when the unit is retracted from the window so that the longitudinal axis of the telescoping members moves from the position indicated by the broken line A, which corresponds to the position of the unit as shown in Fig. 1, to the position indicated by the broken line B, the pivot 39 will move about pivot 41 in counter-clockwise direction, as viewed in the drawings, from the position indicated at 60 to the position indicated at 62. If the fixed distance between the pivots 39 and 31 is measured off on the line B, it will be seen that the pivot 31 will have moved from the position indicated at 64 to the position indicated at 66. As the unit is further retracted, the axis of the telescoping members moves from the position indicated by the line B to the position indicated by the line C, and the pivot 39 will move from the position indicated at 62 to the position indicated at 68. Again, if the fixed distance between the pivots 39 and 31 is measured off on the line C, it will be found that the pivot 31 will have moved from the position shown at 66 to the position shown at 70. The movement of the unit from position A to position C raises the pivot 39 from the point 60 to the point 68 and causes the sleeve 30 to move upwardly a corresponding distance on the rod 34. The upward movement of the sleeve 30, as above demonstrated, is so related to the rotation of the telescoping members about the pivot 35 that the air conditioning unit will move in a horizontal plane from position A to position C. However, as the unit is further retracted into the room to positions D and E, the pivot 39 moves upwardly at an accelerated rate, relative to the rotation of the telescoping members about the pivot 35, so that the upward movement of the sleeve 30 is increased relative to the horizontal movement of the pivot 39 away from the vertical plane of the window. This causes the pivot 31 and, hence, the room end 10 of the unit, to move along a gradually upwardly slanting path from about the point 70 to the point 78, as clearly shown in Fig. 2.

The unit will thus assume a horizontal position when it is in the window and will assume a slightly inclined position when fully retracted into the room. The slanting position of the unit will cause any excess condensate that may have collected in the bottom of the unit to spill out through the window instead of into the room.

When the unit is thus retracted inwardly of the window to any position in which the unit will have a turning moment about rollers 18 in the direction of the room, as for example, when the unit is in position E, the unit will exert a downward force at the pivot 31 which tends to rotate the telescoping members in clockwise direction, as viewed in the drawings, and also tends to cause the sleeve 30 to move downwardly on the rod 34. The force tending to rotate the telescoping members in clockwise direction is opposed by the link 38 which is thereby placed in tension. The force tending to slide the sleeve 30 downwardly on the rod is also opposed by the link 38 but to a variable extent depending upon the angular relation. In positions A, B and C, it is substantially fully opposed. In positions D and E, it is opposed to a successively lesser extent, leaving a residual downward force on the sleeve 30 which will cause the unit and the linkage to move to the left unless opposed in some other manner. The residual downward force may be opposed, for example, by friction between the telescoping members 30 and 34, or by a latch provided for the purpose.

In Figs. 4 and 5, I show a modified embodiment which, except as pointed out, is similar to the embodiment illustrated in Figs. 1 and 2.

In the modified embodiment, a solid rod 82 is substituted for the telescoping members 30 and 34 of Fig. 1, and the lower end of the rod 82 is pivoted, at 84, to a sleeve or collar 86, which is slidable vertically on a rigidly mounted rod 88. A link 92, which corresponds to the link 38 of Fig. 1, is pivoted to the rod 82 at a point equidistant between the pivots 31 and 84, and it is pivoted, at 96, to a bracket 98 secured to the wall of the room immediately below the window sill 8. The length of the link 92 is preferably equal to the portion of the rod 82 between the pivot point 94 and either of the pivots 31 and 84. In order to permit movement of the rod 82 to a substantially vertical position, as shown in dotted lines in Fig. 4, the end of the link 92 which is pivoted to the rod 82 is preferably forked or provided with a forked extension, as best shown in Fig. 5.

Operation—Fig. 4

When the unit is pushed out into the window to the position shown in Fig. 1, the rod 82, the sleeve 86 and the link 92 assume substantially the position shown in dotted lines in Fig. 4. In this position, if the roller 29 is not provided, the turning moment of the unit in the direction of the outside atmosphere will exert an upward force along the axis of the rod 82, which force would tend to cause the sleeve 86 to move upwardly on the guide rod 88. This upward force is effectively resisted by the link 92 which is now in a substantially vertical position. In other words, the upward force exerted on the rod 82 is transmitted to the link 92 through the pivot 94, so that the link 92 is under compression and prevents upward movement of the rod 82 and the sleeve 86 and thereby prevents upward movement of the inner end of the unit.

When the unit is fully retracted into the room, the parts will assume the position shown in solid lines in Fig. 4. When the unit is only partly retracted into the room, as for example, to the position indicated by the broken line 100, the sleeve 86 will occupy the position indicated by the reference numeral 102, and the link 92 will assume the position indicated by the line 104.

In these and other intermediate positions, the unit will have a turning moment about the rollers 18 in the direction of the room. The manner in which this turning moment of the unit is resisted and the unit is prevented from falling into the room is as follows: The downward force imposed on the pivot 81 is resolved into two forces, one tending to rotate the rod 82 in clockwise direction as indicated by the arrow 105, and the other a compression force longitudinally of the rod 82 as indicated by the arrow 106. The rotative force produces at the other end of the rod 82 a rotative force about the pivot 84, as indicated by the arrow 107. The link also serves in resisting the rotative force, that is, it prevents rotation about the pivot 84, and it is thereby placed in tension. The compression force is transmitted through the rod 82 to the pivot 84, and there indicated by the arrow 108. The resultant of the forces on the pivot 84, represented by the arrows 107 and 108, is a horizontal force represented by the arrow 109 and imposed on and resisted by the rod 88, the vertical components balancing each other so that there is no remaining force causing the sleeve 86 to slide on the rod 88. Thus, there is no remaining force tending to move the unit horizontally, and the unit will remain in any position to which it is moved.

The action may be further explained by pointing out that the unit moves entirely in a horizontal plane, so that there is no vertical component of the movement of the unit in which weight or gravity can produce any movement.

It will be noted that the operation of the modified embodiment differs from the operation of the embodiment illustrated in Figs. 1 and 2 in that the unit remains in a horizontal position throughout its movement inwardly into the room, whereas in the embodiment of Fig. 1, when the unit is fully retracted, it assumes a slightly slanting or inclined position. However, the embodiment may be modified to provide different paths of movement. For example, by shifting the rod 88 angularly or rotatively relative to the pivot 96, the path of movement of the pivot 81 will be shifted the same angle about the pivot 96. Also, by providing different lengths of lever arms, paths of different shape may be provided.

From the foregoing it will be seen that I have devised improved mounting means whereby the unit may be bodily moved into the position shown in Fig. 1, or may be bodily retracted to the position shown in Fig. 2 without any skill and with very little effort. It will also be seen that the mounting means is of an extremely simple and inexpensive construction which can easily be set up or removed without material damage to the floor, wall or other woodwork. It will further be noted that whether the unit be retracted into the room, as in Fig. 2, or whether it be in position in the window, as in Fig. 1, the mounting means occupies very little space and is relatively inconspicuous.

While I have shown the invention in several forms, it will be obvious to those skilled in the art that it is not so limited, but is susceptible of various other changes and modifications without departing from the spirit thereof.

What I claim is:

1. Mechanism for mounting a room air conditioning unit or the like in the window of a wall, said mechanism comprising supporting means at the bottom of the window on which said unit may slide horizontally into and out of the window, and means for resisting the turning moment of the end of the unit remote from the window when the unit is slid out of the window, said means comprising a link pivoted at one end to the wall adjacent said supporting means and extending downwardly therefrom, a lever pivoted to said end of the unit and to the lower end of said link and extending downwardly beyond the latter, and means acting on the lever to resist rotative force about the pivotal connection with said link produced by the downward force of the unit on the upper end of the lever.

2. In combination, a room air conditioning unit adapted to be mounted in a window opening in a vertical wall of the room, means slidably supporting said unit for horizontal movement relative to said window opening to a position in which said unit is disposed inwardly of said window opening and has a turning moment in the direction of the room, and means for resisting the turning moment of the unit, said means including a first elongated member, means pivotally connecting said member to a fixed support below and inwardly of said opening, a second elongated member pivoted to the room end of said unit and slidably engaging said first member, and a link pivoted at one end thereof to said second member and pivoted at its other end to a fixed support adjacent the lower end of said window, said elongated members, said fixed supports, and said link being so related that, when said unit is in said position, said second member and said link are disposed at an angle to each other and to said vertical wall and downward pull at the pivotal connection of said second member with the room end of said unit is transmitted to, and is resisted by, said fixed supports to resist turning moment of said unit in the direction of the room.

3. The structure recited in claim 2 in which said unit is also movable to a second position in which said unit extends into the window opening and has a turning moment in the direction of the outside atmosphere and in which, when said unit is in said second position, said second member is substantially vertical, the pivots of said link are substantially vertically aligned, and upward pull exerted on said second member is transmitted to, and is resisted by, said link to resist the turning moment of the unit in the direction of the outside atmosphere.

4. In combination, a room air conditioning unit adapted to be mounted in a window opening in a vertical wall of the room, means slidably supporting said unit for horizontal movement relative to the lower portion of said window opening to a first position in which the outer end of said unit extends outwardly through said opening and into a second position in which the outer end of said unit is disposed inwardly of said window opening and said unit has a turning moment in the direction of the room, and means for resisting the turning moment of the unit, said means including a first elongated member, means securing said member to a fixed support below and inwardly of said opening, a second elongated member pivoted to the room end of said unit and slidably engaging said first member, and a link pivoted at one end thereof to said second member at a point remote from the pivotal connection of said second elongated member with the inner end of said unit a distance substantially equal to the length of said link, said link being pivoted at its other end to a fixed support disposed at a point immediately adjacent the lower end of said window opening, said link and said second member being so related that, as said unit is moved toward said second position, the pivotal connection of said link with said second member moves upwardly and away from said vertical wall, said second elongated member slides upwardly on said first elongated member, and the longitudinal axes of said link and said second member approach a position in which said axes are substantially normal to each other, and as said unit is moved toward said first position, the pivotal connection of said link with said second member moves downwardly and towards said vertical wall, said second elongated member slides downwardly on said first elongated member, and said axes approach a position in which they are substantially vertical and parallel.

5. In combination, a room air conditioning unit adapted to be mounted in a window opening formed in a vertical wall of the room, means slidably supporting said unit for substantially horizontal movement relative to said window opening to a first position in which the unit extends into said opening and into a second position in which said unit is disposed inwardly of said window opening and has a turning moment in the direction of the room, and means for resisting the turning moment, said means including expansible telescoping members pivotally connected to the room end of the unit and to a fixed support disposed inwardly of and below said opening, and a link pivoted to said members and to a fixed support disposed inwardly of and below said opening, said telescoping members and said link being so proportioned and related that, as said unit is moved to one of its said positions, said link rotates in one direction about its pivotal connection with its fixed support and said telescoping members rotate in the opposite direction about their fixed support, and vice versa.

6. In combination, a room air conditioning unit adapted to be mounted in a window opening formed in a vertical wall of the room, means slidably supporting said unit for substantially horizontal movement relative to the lower portion of said window opening to a position in which the outer end of said unit is spaced inwardly of said window opening and said unit has a turning moment in the direction of the room, and means for resisting the turning moment of the unit, said means including an upper elongated member pivoted at its upper end to the room end of said unit, a lower elongated member having its upper portion telescopically engaging a lower portion of said upper member and pivoted at its lower end to a fixed support disposed below and inwardly of said opening, and a link pivoted at one end thereof to the lower portion of said upper member and pivoted at its other end to a fixed support disposed immediately adjacent the lower end of said window opening, said link and said members being so proportioned and related that, as said unit is moved toward said position, the pivotal connection of said upper member moves upwardly and away from said vertical wall and said upper member slides upwardly relative to said lower member.

7. The structure recited in claim 6 in which said unit is movable to a second position in which the outer end of said unit extends through said window opening and said unit has a turning moment in the direction of the outside atmosphere, and in which as said unit is moved toward said second position, the pivotal connection of said link with said upper member moves downwardly and towards said vertical wall and said upper member slides downwardly relative to said lower member.

8. The structure recited in claim 5 in which, when said unit is in said first position, said link and said telescoping members assume substantially vertical positions, and in which, when said unit is in said second position, the longitudinal axes of said telescoping members and of said link form acute angles with perpendicular lines passing through the respective pivotal connections of said telescoping members and said link.

9. The structure recited in claim 5 in which said telescoping members comprise a tubular member pivoted at its upper end to the inner end of said unit, and an elongated member pivoted at its lower end to a fixed support disposed inwardly of and below said window with the upper portion of said elongated member extending upwardly into and slidably engaging the lower portion of said tubular member, and in which said link is pivotally connected to the lower portion of said tubular member, the pivotal connection of said link with said tubular member, in all positions of said unit, being below the pivotal connection of said link with its fixed support.

CLIFFORD S. CODY.

REFERENCES CITED

The following references are of record in the file of this patent:

UNITED STATES PATENTS

| Number | Name | Date |
|---|---|---|
| 1,958,677 | Phillips | May 15, 1934 |
| 2,029,610 | Campbell et al. | Feb. 4, 1936 |
| 1,324,713 | Adsit | Dec. 9, 1919 |
| 2,316,640 | Williams | Apr. 13, 1943 |